July 11, 1944.   W. R. ANDERSON   2,353,134
METHOD OF MANUFACTURING BARRELS
Original Filed March 24, 1939   6 Sheets-Sheet 1
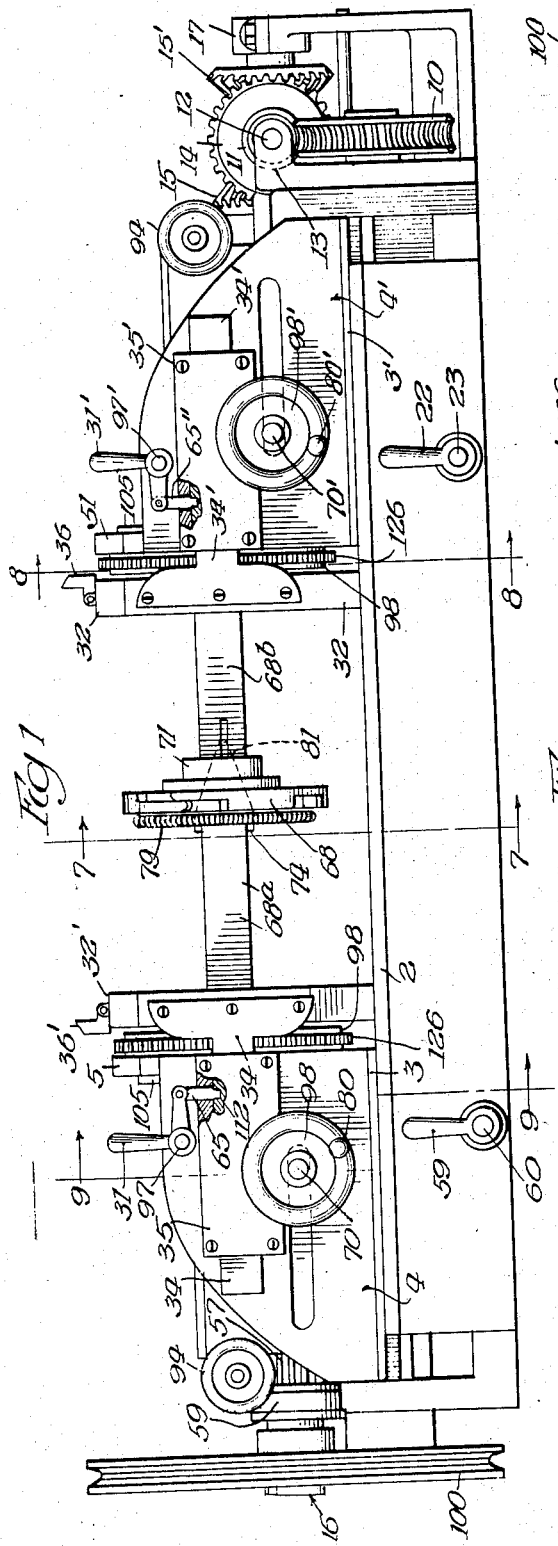
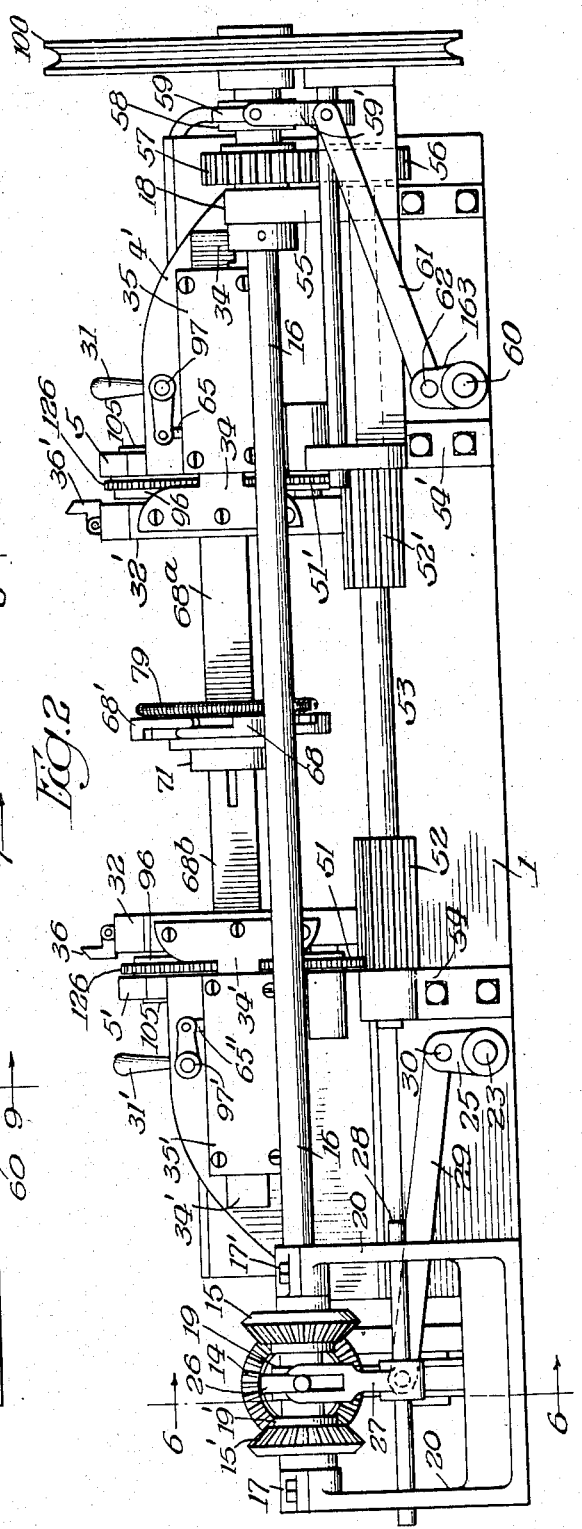
Inventor
William R. Anderson
By J. Jochum, Atty.

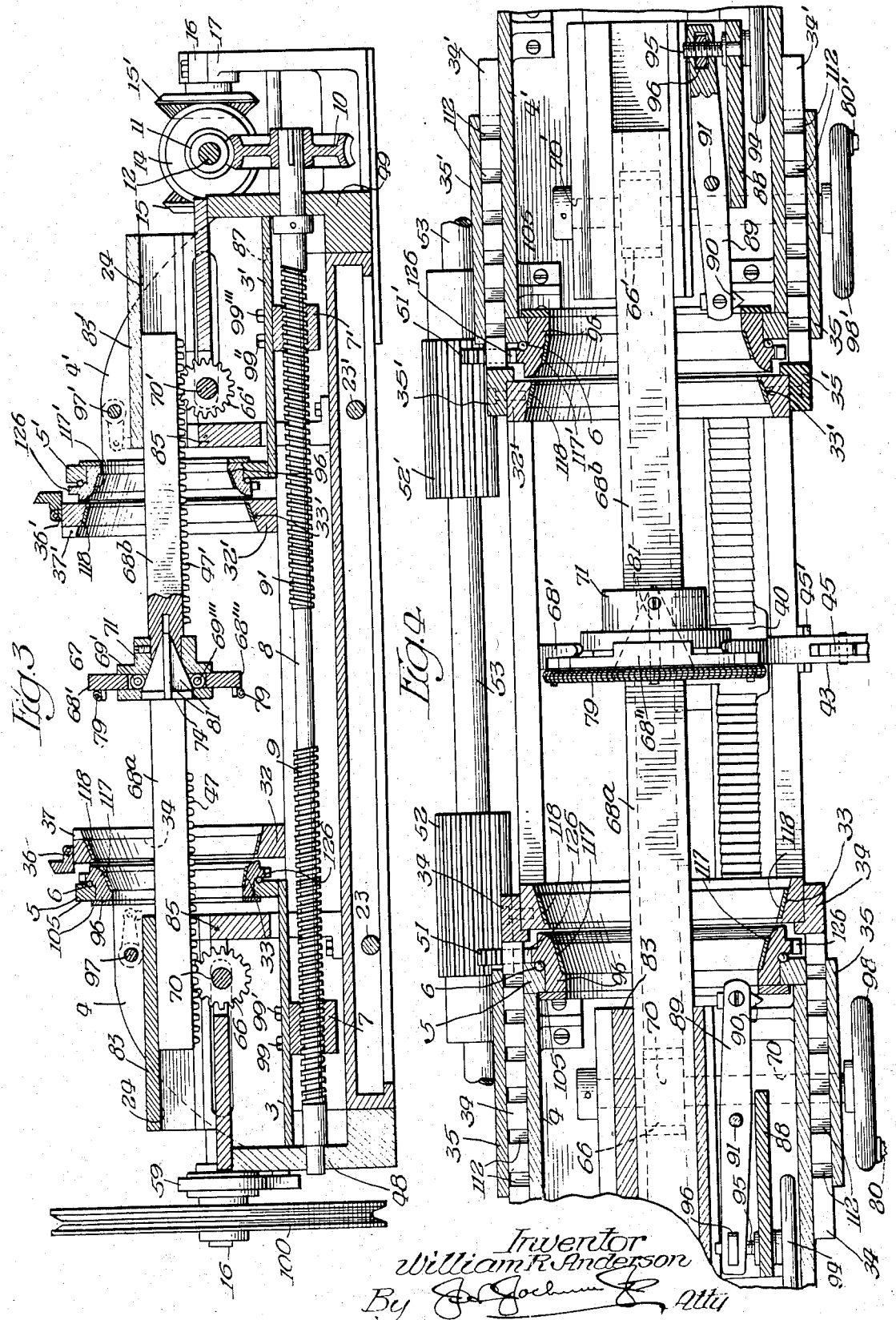

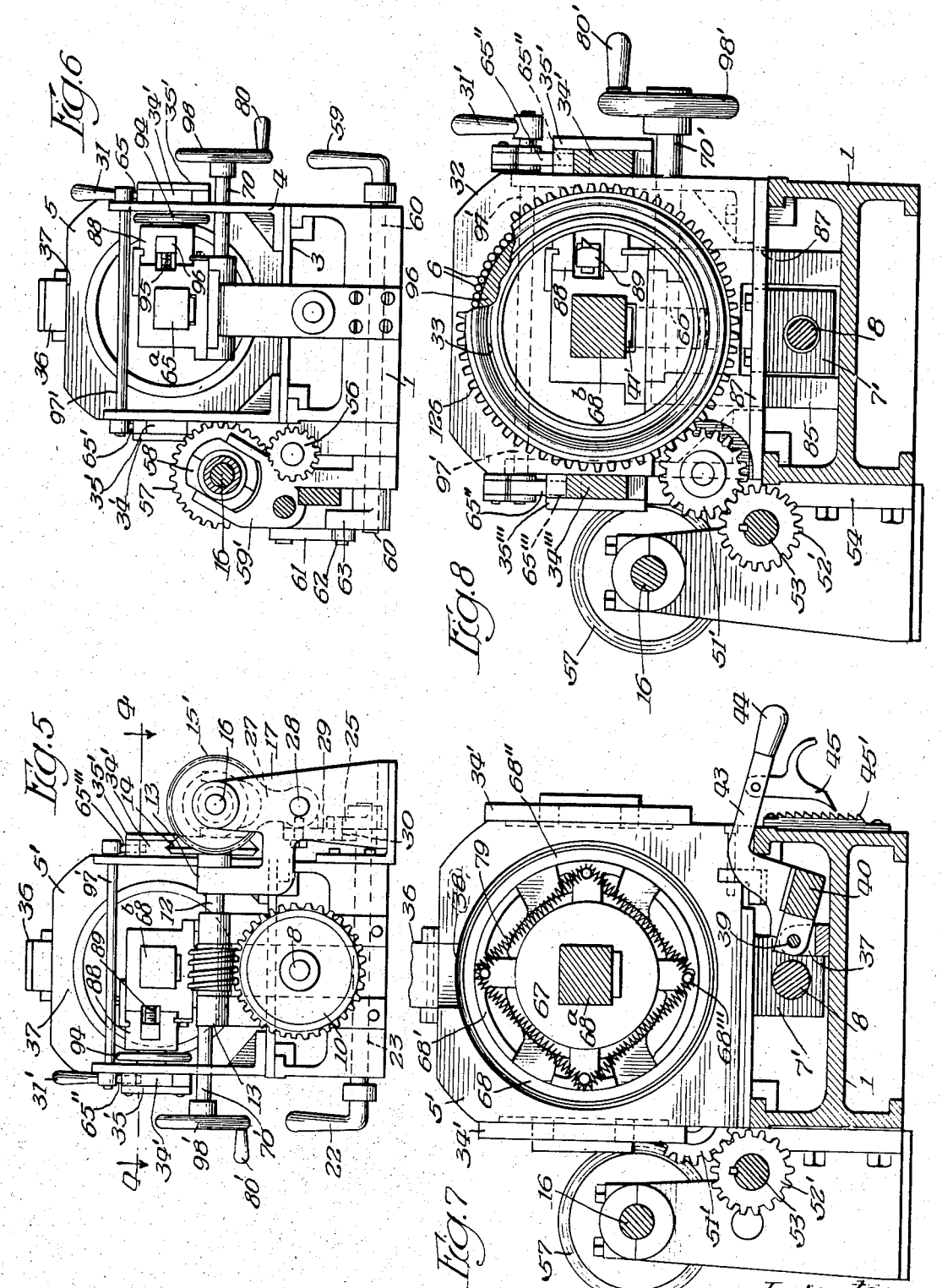

July 11, 1944.   W. R. ANDERSON   2,353,134
METHOD OF MANUFACTURING BARRELS
Original Filed March 24, 1939    6 Sheets-Sheet 4
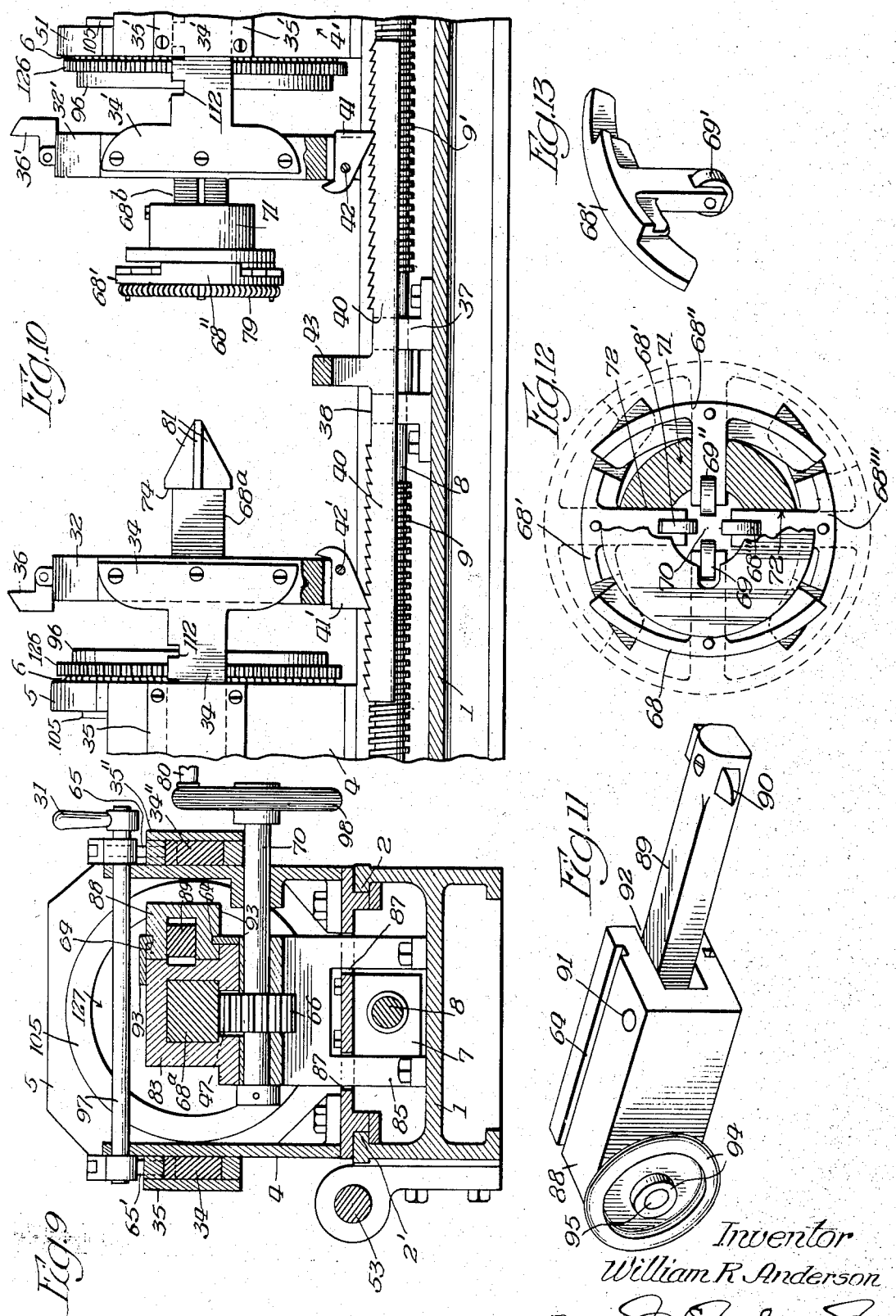
Inventor
William R. Anderson
By July 11, 1944.　　　W. R. ANDERSON　　　2,353,134
METHOD OF MANUFACTURING BARRELS
Original Filed March 24, 1939　　6 Sheets-Sheet 5
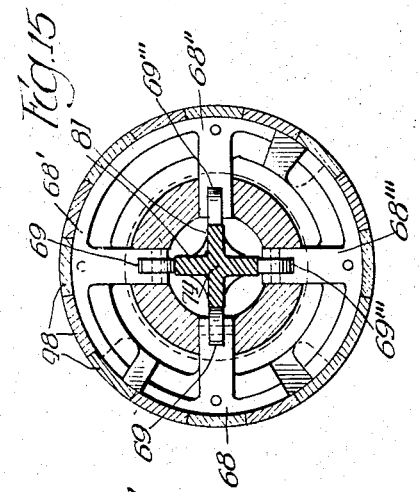
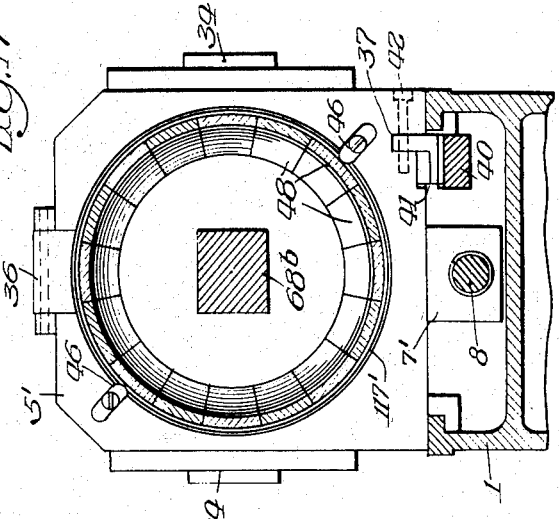
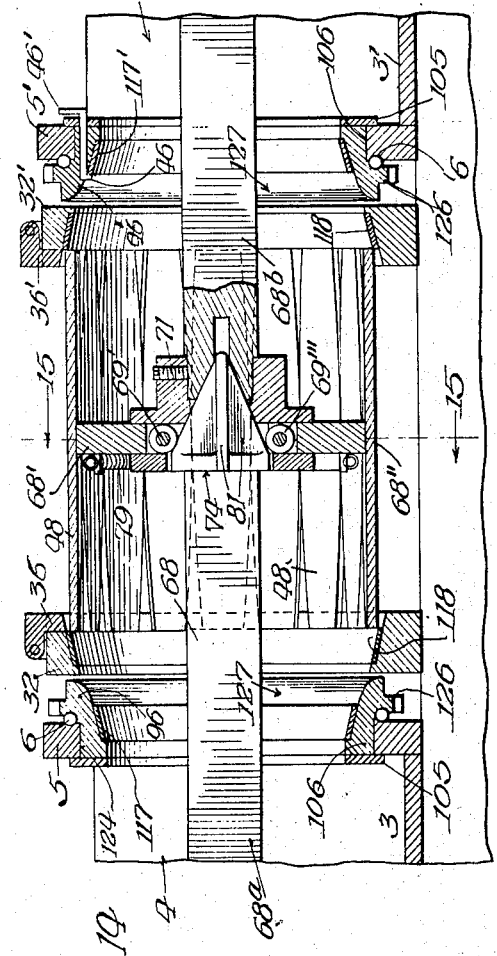
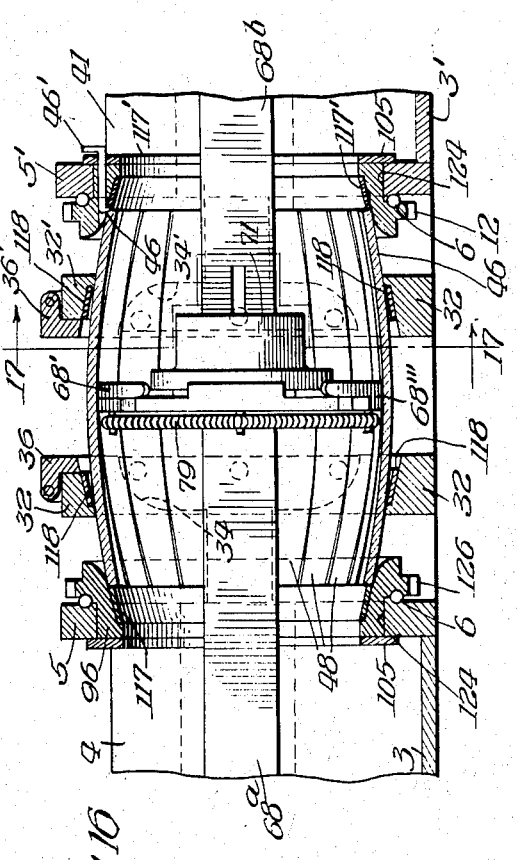
Inventor
William R. Anderson
By July 11, 1944. W. R. ANDERSON 2,353,134
METHOD OF MANUFACTURING BARRELS
Original Filed March 24, 1939 6 Sheets-Sheet 6
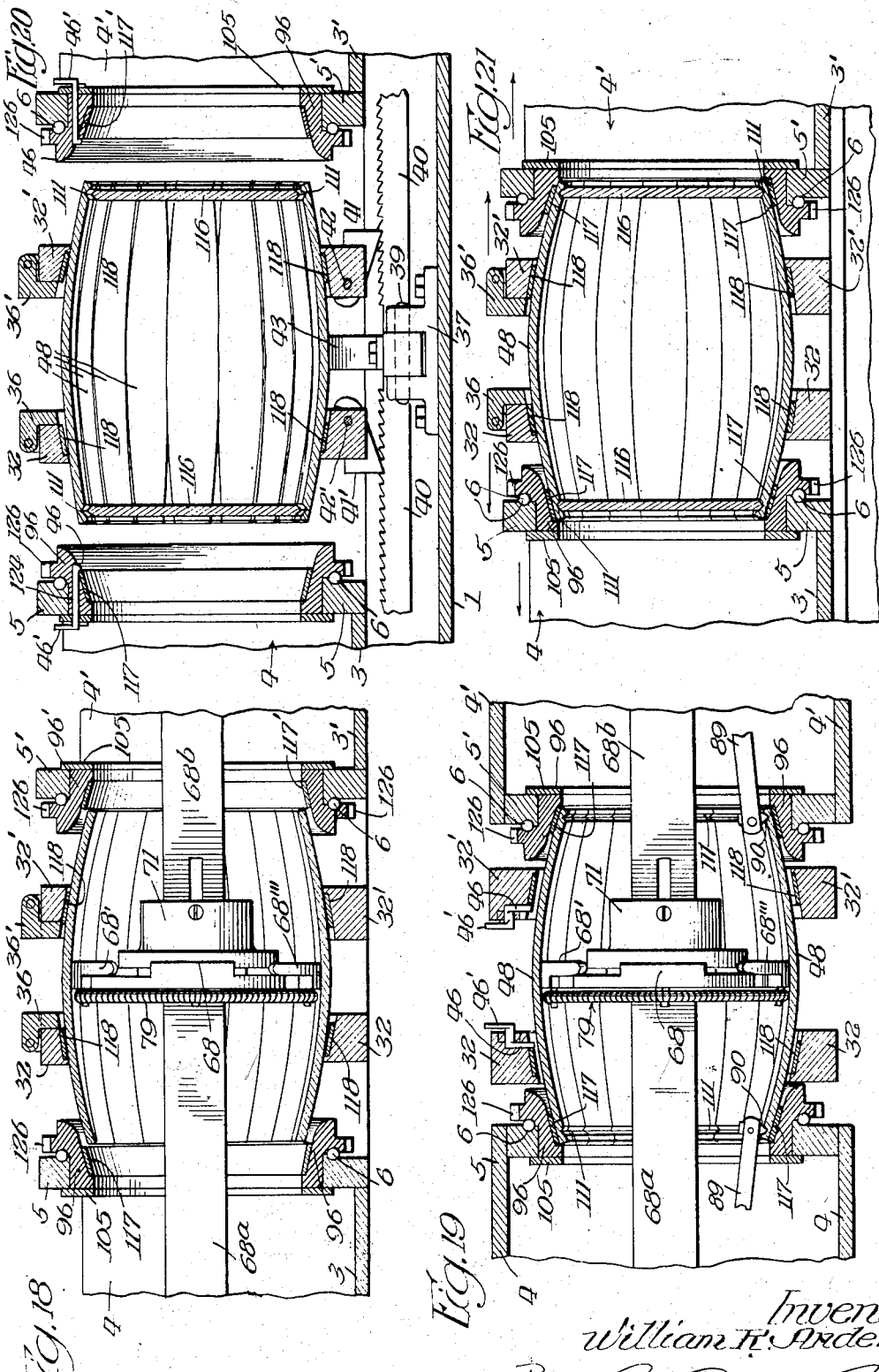
Inventor
William R. Anderson
By
Atty.

Patented July 11, 1944

2,353,134

UNITED STATES PATENT OFFICE 2,353,134

METHOD OF MANUFACTURING BARRELS

William R. Anderson, Chicago, Ill.

Original application March 24, 1939, Serial No. 263,942. Divided and this application May 22, 1942, Serial No. 444,050. In Great Britain November 1, 1937

9 Claims. (Cl. 144—309)

This application is a division of original application, Serial No. 263,942, Patent 2,287,655, June 23, 1942, and relates more particularly to an improved method of manufacturing barrels.

It is one of the objects of the present invention to provide an improved method of manufacturing barrels, whereby a large number of the heretofore necessary hand operations will be eliminated by means of the use of a single sturdy, compact and simple machine for carrying into operation this improved method, by grouping said means and instrumentalities capable of performing the entire series of steps necessary to manufacture, as a completely finished product, a wooden keg or barrel, starting with flat steamed staves.

A further object is to provide an improved method wherein all of the necessary staves in a flat condition are assembled into a drum, and so held that the ends of the staves may be simultaneously contracted or partially drawn together by bending the staves intermediate their ends while being maintained against bodily inward movement, such contraction or drawing together being accomplished by means of hoops forced over the ends of the staves in directions lengthwise of the staves. The partially contracted or bent staves are subsequently further drawn together by additional end hoops, also forced over the extremities of the staves, and are temporarily held by the last said hoops while the ends of the staves are crozed for the reception of barrel ends.

This crozing is accomplished by means of suitable crozing tools, and either the tools or the drum may be rotated while the other may be maintained against rotation. In the present exemplification of this invention, however, the drum is rotated while the tool is maintained against rotation. After the crozing operation has been completed, the end hoops are removed to permit the ends of the staves to expand or spring away from each other, while the staves are maintained in a partially contracted or bent condition. The expansion of the extremities of the staves is provided so as to permit the positioning of the ends of the barrel in the drum. The end hoops are then forced back upon the staves to simultaneously contract or draw together the ends of the staves about the barrel heads, the end hoops being then permanently maintained upon the barrel.

To the attainment of these ends and the accomplishment of other new and useful objects as will appear, the invention consists in substantially the herein described method, and steps in the accomplishment thereof, hereinafter more fully described and claimed, taken in connection with the accompanying drawings illustrating one type of mechanism by means of the use of which this improved method may be carried into operation, and in which drawings:

Fig. 1 is a side elevation of a machine or apparatus adapted to carry this method into operation.

Fig. 2 is an elevation taken from the side of the machine opposite to that shown in Fig. 1.

Fig. 3 is a vertical longitudinal sectional view of Fig. 1.

Fig. 4 is a horizontal sectional view, on an enlarged scale, taken on line 4—4, Fig. 5.

Fig. 5 is a right-hand elevation of Fig. 1.

Fig. 6 is a view taken on line 6—6, Fig. 2, partly in elevation, partly in section, and with parts omitted, on an enlarged scale.

Fig. 7 is a detail vertical sectional view, on an enlarged scale, taken on line 7—7, Fig. 1.

Fig. 8 is a view partly in elevation, partly in section, and partly broken away, taken on line 8—8, Fig. 1, on an enlarged scale.

Fig. 9 is a detail sectional view taken on line 9—9, Fig. 1, on an enlarged scale.

Fig. 10 is a detail view partly in side elevation, partly in section, and with parts omitted, showing the hoop-holding members and the expansible ring or anvil in partly separated positions.

Fig. 11 is a detail perspective view of one of the crozing knives.

Fig. 12 is a view partly in front elevation, partly in section, and partly broken away, of the expander ring.

Fig. 13 is a detail perspective view of one of the elements of the expander ring.

Fig. 14 is a view partly in section, and partly in elevation, showing the position which some of the parts will assume at the time the barrel staves are first placed into the machine.

Fig. 15 is a detail sectional view taken on line 15—15, Fig. 14.

Fig. 16 is a view similar to Fig. 14, showing the parts in another position, some of the parts being shown in elevation.

Fig. 17 is a detail sectional view taken on line 17—17, Fig. 16.

Figs. 18, 19, 20 and 21 are detail sectional views showing the positions which some of the parts will assume at the different stages or steps of operation of the machine and of the method in assembling the staves into a barrel.

The machine as illustrated, which is adapted to carry the steps of this improved method into operation, consists essentially of a support base 1, upon which the mechanism is mounted, and is provided with guide-ways 2 and 2' which act as tracks upon sliding adjustable tables 3 and 3' which move toward and from each other in directions longitudinal of the machine.

Centrally attached to and under the base of the table 3 by means of bolts 99 and 99', as shown more clearly in Figure 3, is a threaded nut 7, and under the table 3' and secured thereto by bolts 99'' and 99''', is a similar nut 7'.

Side table brackets 4 and 4' brace the front table brackets 5 and 5', and the latter have annular inside openings, as at 124, and contain ball thrust bearings 6, as shown more particularly in Figure 8. These brackets are adapted to support rotary end hoop containers 96 and 96', each of which has a beveled annular opening 127, geared flange 126, bearing portion 106, and detachable retaining flange 105. Said end hoop containers are designed to contain or hold the end hoops 117 and 117' of a barrel.

A series of lug or loop locks, such as lock 46, are countersunk into and flush with the faces of the hoop containers 96 and 96', and may be actuated by a hand hold 46'.

The rotation of hoop containers 96 and 96' is effected through idler gears 51 and 51' which connect with pinion gears 52 and 52', said pinion gears being keyed to shaft 53.

The nut on table 3 is threaded left-handed, and that on table base 3' is threaded right-handed. A suitable rotary shaft 8 with left-handed thread 9 and right-handed thread 9', is attached longitudinally with suitable bearings 48 and 49 centrally on top of base 1, directly below tables 3 and 3' in such manner that, when it is rotated through nuts 7 and 7', the tables will slide either toward or away from each other, in accordance with the direction of the shaft rotation.

Worm gear 10 is keyed to rotary shaft 8 and is driven by worm 11 which rotates on shaft 12 in bearings 13 and 13'. Bevel gear 14 is keyed to shaft 12 and meshed with bevel gears 15 and 15'. Bevel gears 15 and 15' rotate on rotary shaft 16 which rotates in bearings 17, 17' and 18. The direction of the rotation of worm 11 is governed by clutches 19 and 19', which can alternately be engaged with bevel gears 15 and 15'. Bearing bracket 20 suitably supports bearings 17 and 17' and is attached to base 1. Handle 22 keyed to shaft 23, is a clutch control lever. The rear end of shaft 23 is suitably connected to arm 25.

A suitable clutch shifting device consists of collar 26, shifting finger 27, sliding rod 28, and arm 29 which pivots on pin 30 in arm 25 in such manner that the movement of handle 22 governs the shifting of clutches 19 and 19'.

Truss brackets 32 and 32' each consist of a suitable frame with beveled interior openings 33 and 33'. Said openings are similar in size and shape to the openings in the interior of the barrel truss hoops commonly used in the cooperage industry. Said brackets are supported by arms 34, 34', 34'' and 34'''. Centrally located on the top of truss bracket 32 is a stave door 36, and upon top of truss bracket 32' is stave door 36'. These doors can be opened or closed. When they are opened, staves can enter the machine through openings 37 and 37'.

When tables 3 and 3' move toward each other, truss brackets 32 and 32' are also moved toward each other, and unless they are locked in their desired positions, said brackets, merely by force of the friction of arms 34, 34', 34'' and 34''' in their respective grooves, have a tendency to move away from each other when the tables are moved away from each other.

In order to overcome this objection, there is provided locking means for the inner hoop holding members 32—32', which embodies a member 40 pivotally mounted between bracket or bearing members 37—38 upon the pivot pin 49 (see particularly Figures 7 and 10). This member 40 is provided with right and left facing ratchet teeth to be engaged by pivotally mounted elements 41—41' in such a manner that, when the handle 44 is operated to swing the bar 43 and consequently the member 40 upwardly, the elements or lugs 41—41' will engage the respective teeth and will hold the inner hoop holding members 32—32' in their desired position. As shown more clearly in Figure 7, the member 40 and the bar 43 may be held in their elevated or raised position by means of a dog or pawl 45 engaging ratchet teeth 45'.

Shaft 53 rotates in bearings 54, 54' and 55. The rotation of this shaft is effected through gear 56 which meshes with gear 57 which is controlled by clutch 58. Handle 59 connected to shaft 60, is the control lever for clutch 58.

Collar 59, yoke 59', link 61, pivot pin 62, and arm 63 on shaft 60, comprise a shiftable clutch mechanism for controlling the gear 57.

An expansion ring device (see particularly Figures 7 and 12) consists of expansion ring 67, a pair of slidable rectangular rams 68ª and 68ᵇ which are racks with geared teeth 47 and 47' cut into their lower edges, means for moving said rams toward and away from each other, proper housings and supports for each ram, and a plunger head 74 adapted to plunge into an opening 70 in expansion ring 67.

The expansion ring 67 consists of slidable rams 68, 68', 68'' and 68''', rollers 69, 69', 69'' and 69''', suitable circular frame or housing 71, with slotted guide-ways 72, and a coil spring 79 adapted to hold the slidable rams in their proper position. This expansion ring is attached to one end of slidable ram 68ᵇ.

The plunger head 74 is attached to one end of slidable ram 68 in such manner that it is directly in front of the center of expansion ring 67. The sliding movement of each ram is effected by their respective geared teeth 47 and 47', gears 66 and 66', shafts 70 and 70', and control handles 80 and 80' on wheels 98 and 98'. The plunger head has four equally spaced ribs 81, as shown in Figure 1.

When the expansion ring and the plunger head are forced together, the ring is expanded so that the outside circumference is a perfect circle, the plunger head ribs pressing outward against rollers 69, 69', 69'' and 69'''.

When the tables 3 and 3' move either forward or backward, the housing and supports of the slidable rams 68 and 68' are not affected.

The rams 68ª and 68ᵇ each slide in a slot 24 in their respective housings 83 and 83', and these housings are supported at one end by posts 85, and the posts are attached to or supported by the top of the base 1. These posts project upwardly from the base 1 through slots 87 in the movable tables 3—3', and the purpose of said slots is to provide the necessary clearance to the stationary posts so that the tables 3—3' can be moved toward and away from each other.

As shown more particularly in Figures 4 and 11, the crozing knife devices each consist of a grooved housing 88, knife holding bar 89, and a crozing knife 90. The knife holding bar 89 moves upon a pivot pin 91 in slot 92. Tracks 93 and 93' are attached to the crozing knife housing and are adapted to slide in suitable grooves similar to groove 64 (Figure 18) laterally installed in ram housings 83 and 83' in a direction substantially longitudinal of the machine in such manner that the entire crozing knife device can be moved to and from a barrel assembled in the machine. The feeding of crozing knives 90 into the end of a spinning barrel is effected by means of hand control wheel 94 which turns the threaded shaft 95 through nut 96 and is pivotally attached to the end of crozing knife bar 89 which is opposite the knife end of said bar.

The combination of the crozing knife device with the spinning of the barrel may be compared to a common wood turning lathe.

As shown in Figure 14, the first step in assembling a barrel is to place the staves 48 through the stave door openings 37—37' on the fully expanded expansion ring 67, which latter must be centrally located between the properly spaced truss brackets or inner hoop holding members 32—32'. The staves as they are thus inserted, are fed or successively moved around the expansion ring 67 by hand, and this operation is continued until all of the staves have been placed in position to form an unbent barrel drum, as shown more particularly in Figure 14. The staves are held in this position around the expansion ring 67 by means of the beveled or tapered inside annular openings in the truss brackets or inner hoop holding members 32—32'.

Stave doors 36 and 36' are then closed to keep the last stave from springing out of the machine during the bending operation. With the end barrel hoops 117 and 117' placed in hoop containers 5 and 5', the bending operation is effected by first moving tables 3 and 3' sufficiently together to slightly bend the staves by forcing beveled truss brackets 32—32' a short distance on the barrel. The ends of the barrel have then not been squeezed or trussed small enough in diameter to enter the end hoops 117—117', and they butt against the faces of the hoop containers 5 and 5', and are equalized in their position by a slight pressure exerted by the faces of said hoop containers. Truss brackets 32 and 32' are then locked in their present positions by means of locking device 40, and tables 3 and 3' are moved away from each other to a suitable distance, and the truss bracket arms 34—34'—34'' and 34''' are locked by operating the hand levers 31 and 31' which are connected to shafts 97 and 97' and operate lugs 65—65'—65''—65''' which may rise or fall in or out of slots similar to 112 (see Figure 10) in said bracket arms.

The truss brackets 32 and 32' are then unlocked and forced toward each other, and the barrel is squeezed or trussed between the annular beveled openings in said brackets and thoroughly tightened in the center with the outside diameter of the ends of the barrel sufficiently reduced to permit the end hoops 117 and 117' to pass around the staves. The truss arm locks 40 and 41 are then unlocked and the tables are again moved toward each other, firmly trussing the ends of the barrel into their proper configuration.

When the end hoops are firmly on the barrel and the expansion ring is reduced in diameter, it may be removed through the end of the partially formed barrel, and the center truss brackets 32—32' may be forced away from each other by hand, permitting the barrel to be spun in the end hoop containers. The crozing knife devices are then moved to their proper positions, the barrel is spun and crozed in a manner similar to a wood turning lathe, and its exterior may also then be planed.

The center truss brackets 32—32' are then slightly forced forward by hand, and locked. The expansion ring 67 is again expanded, thus holding the barrel in a firm position as the tables are moved away from each other. The locked end hoops 117—117' are thereby withdrawn from the barrel and both ends of the barrel spring open sufficiently to permit the entrance of the two heads. The expansion ring device is then contracted or reduced in diameter so as to permit it to be entirely withdrawn from the barrel through one end thereof. The heads are then placed in the crozed grooves at each end of the barrel by hand.

The tables are then moved toward each other forcing on the end hoops 117—117', thoroughly tightening the barrel. The end hoops locking devices are then released and the tables withdrawn, leaving the end hoops 117—117' on the completed barrel. Center hoops can then be placed around the barrel and tightened by forcing the faces of the truss brackets against them.

A V-belt pulley 100 is keyed onto the main drive shaft 16.

All of the movements involved in the entire operation of the machine are rendered active by being clutched to the said drive shaft.

Figures 4 and 11 show in detail the crozing knife which operates in the manner described so that the knife 90 cuts the chine in the staves 48 (see Figure 19), and the knife is adjustable by turning the handle 94 on the threaded shaft 95 which will cause the bar 89 to rock about its pivot 91.

Figure 7 illustrates in detail the locking mechanism for the inner hoop holding members or truss brackets by means of the pawl or dog 45 which is pivotally attached to the bar 43 so that it can be engaged or disengaged from the rack 45', which latter is provided with teeth so that when the handle 44 is raised, the locking member or rack 40 will also be elevated. When this member or rack 40 is raised, the locking elements 41—41' engage the teeth on the member 40 and thereby lock the truss or inner hoop holding brackets 32—32' against movement in directions away from each other.

While there is shown by way of illustration, a machine which has proven highly satisfactory in practice, it is to be understood that any machine capable of performing the steps in the method may be employed, and it is also to be understood that, while the preferred method and the steps in the operation thereof have been fully described, such steps and the method, as well as the sequence of the steps in the method, may be varied, within the scope of the claims, without departing from the spirit of this invention.

What is claimed as new is:

1. The method of forming a barrel which consists in assembling a plurality of staves into a drum and supporting them at substantially their inner longitudinal centers, then partially and simultaneously bending the staves by placing hoops upon the staves over the ends thereof toward their centers and maintaining them in their partially bent positions by pressure exerted by said hoops, then compressing the ends of the staves also by pressure exerted lengthwise of the staves by sleeving of end hoops thereover, then crozing the ends of the drum, then withdrawing the end hoops, then placing the ends of the barrel in position, and finally again compressing the ends of the drum about said barrel ends by re-applying the end hoops.

2. The method of forming a barrel which consists in assembling the staves to form a barrel drum, then forcing hoops upon said drum over and from the ends thereof and in directions lengthwise of the staves to bend the staves by partially contracting or drawing the ends of the staves together, then forcing end hoops onto the drum over the ends of the staves to further contract or draw together such ends, then crozing the ends of the staves, then releasing the ends of the staves to permit them to spring apart sufficiently to permit the insertion of barrel ends, then again contracting the ends of the staves to secure the heads into position by forcing the end hoops back upon the staves.

3. The method of forming a barrel which consists in assembling the staves to form a barrel drum, then forcing hoops upon said drum over the staves from the ends thereof and in directions lengthwise of the staves to bend the staves by partially contracting or drawing the ends of the staves together, then forcing end hoops onto the drum over the ends of the staves to further contract or draw together such ends, rotating the drum and while it is being rotated, crozing the ends of the staves, then releasing the ends of the staves to permit them to spring apart sufficiently to permit the insertion of barrel ends, then again contracting the ends of the staves to secure the heads into position by forcing the end hoops back upon the staves.

4. The method of forming a barrel which consists in arranging a plurality of unbent staves in assembled relation, then by forcing hoops over the ends of the staves in directions lengthwise of the staves, simultaneously and partially contract the ends of the staves and partially bend them intermediate their ends, then further simultaneously contracting such ends of the staves by forcing additional hoops over the partially contracted ends to temporarily hold the ends together, then crozing the ends of the staves when thus held together, then releasing the crozed ends, then inserting barrel ends between the staves, and finally again contracting the ends of the staves about said ends.

5. The method of forming a barrel which consists in arranging a plurality of unbent staves in assembled relation, then by forcing hoops over the ends of the staves in directions lengthwise thereof, partially and simultaneously bend the staves intermediate their ends, then further and simultaneously contract such ends of the staves by forcing additional hoops over the partially contracted ends to temporarily hold the ends together, then crozing the ends of the staves when thus held together, then releasing the crozed ends, then inserting barrel ends between the staves, and finally again permanently contracting said ends about the heads, by pressure exerted by the hoops in directions lengthwise of the staves.

6. The method of forming a barrel which consists in arranging a plurality of unbent staves in assembled relation, then by forcing hoops over the ends of the staves in directions lengthwise thereof, partially contract said ends by simultaneously partially bending the staves intermediate their ends, then further simultaneously contract such ends of the staves by forcing additional hoops over the partially contracted ends to temporarily hold the ends together, then crozing the ends of the staves when thus held together, by rotating the assembled structure and a crozing instrument, one with relation to the other, then releasing the crozed ends, then inserting barrel ends between the staves, and finally again contracting the ends of the staves about said ends.

7. The method of forming a barrel which consists in arranging a plurality of unbent staves in assembled relation to form a drum, then by forcing hoops over the stave ends in directions lengthwise of the staves, partially draw the ends of the staves together by simultaneously bending the staves intermediate their ends while maintaining the staves against bodily inward movement, then further and simultaneously draw and temporarily hold the ends together by additional hoops forced over such ends, then operating upon the ends of the staves to prepare them for the reception of barrel ends, then allowing the hoops to partially expand to permit positioning of the barrel end, and finally again simultaneously contracting the ends of the staves about said ends.

8. The method of forming a barrel which consists in arranging a plurality of unbent staves in assembled relation to form a drum, then by forcing a hoop over the ends of the staves in a direction lengthwise of the staves, partially draw the ends of the staves together by simultaneously bending the staves intermediate their ends while maintaining the staves against bodily inward movement, then further and simultaneously drawing and temporarily holding the ends together by additional hoops forced over such ends, then operating upon the ends of the staves to prepare them for the reception of barrel ends, then allowing the hoops to partially expand to permit positioning of the barrel end, and finally again simultaneously contracting the ends of the staves about said ends, by sleeving the end hoop over the ends of the staves and permanently securing the end hoop in position.

9. The method of assembling a complete wooden barrel, which consists in "setting up" or assembling the staves to be bent into a barrel by supporting said staves approximately at the longitudinal centers thereof, and also supporting their outer ends, trussing the staves together by forcing an end hoop over each end of the assembled staves in a direction lengthwise of the staves, then rotating the partially formed barrel and, while rotating, crozing both ends of the assembled staves, then opening the end of the barrel sufficiently to release said ends, to permit a head to be placed in the end, then placing said head in proper position into the barrel by hand, then tightening the barrel sufficiently to permit the end hoops to be forced onto said barrel, then releasing the barrel, then placing a center bilge barrel hoop by hand over each end of the barrel, and finally forcing the center hoops into position to complete the barrel.

WILLIAM R. ANDERSON.